H. M. PFLAGER.
CAR MOTOR TRUCK.
APPLICATION FILED JUNE 27, 1921.

1,400,402.

Patented Mar. 14, 1922.

Inventor
Harry M. Pflager

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR MOTOR TRUCK.

1,409,402.

Specification of Letters Patent.  Patented Mar. 14, 1922.

Application filed June 27, 1921. Serial No. 480,762.

*To all whom it may concern:*

Be it known that I, HARRY M. PFLAGER, a citizen of the United States, residing at St. Louis, Missouri, have invented a certain new and useful Improvement in Car Motor Trucks, of which the following is a full, clear, and exact description, such as will enable others skilled in the art to which it appertains to make and use the same, reference being had to the accompanying drawings, forming part of this specification.

My invention relates to railroad rolling stock and consists in an improved truck construction especially adapted for use on four wheel motor trucks such as are commonly used on street cars.

The main object of my invention is to permit the use of a short wheel base on trucks of this type, and an additional object is to provide means for distributing the torque of a motor mounted on one or more axles of the truck to both of the truck transoms and consequently more evenly over the truck frame.

It is desirable in motor trucks to have them as flexible as possible vertically, but very rigid horizontally, as there is a tendency in rounding curves for one side frame to run ahead of the other. An additional object of my invention is to provide transoms which act in the capacity of diagonal braces to stiffen the truck frame horizontally and which thereby differ from the usual truck construction in which the transoms form a rectangular opening in which the bolster is located and which destroys any diagonal bracing effect which might otherwise be secured from the transoms.

In the accompanying drawings, which illustrate a selected embodiment of my invention—

Figure 1:
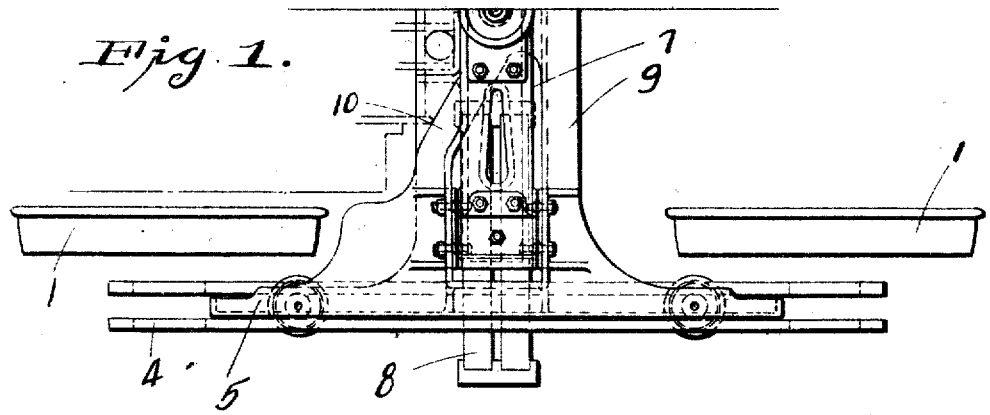
Figure 1 is a top view of a longitudinal half of a four wheel truck.
Figure 2:
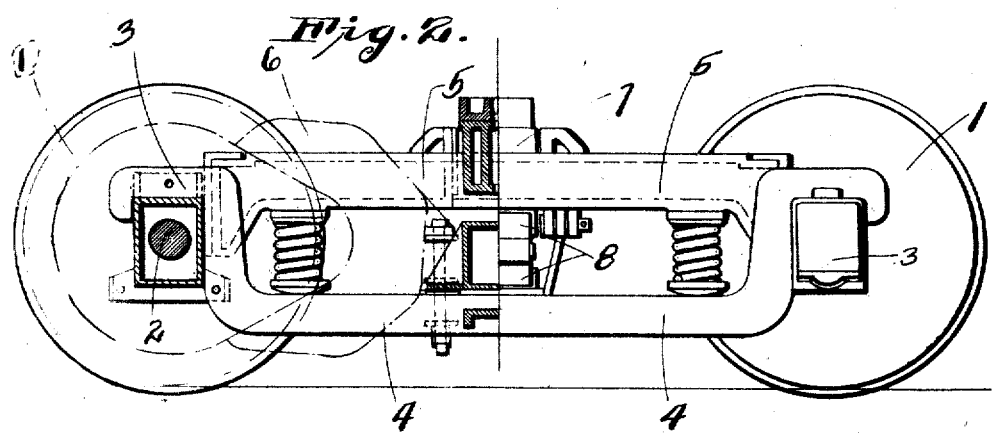
Figure 2 is in part a longitudinal vertical central section through the truck and in part a side elevation of same.
Figure 3:
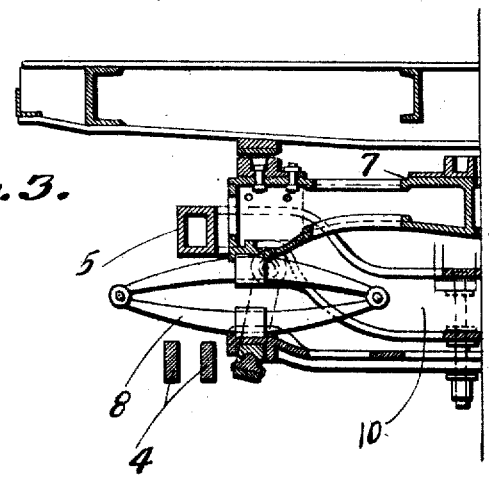
Figure 3 is a vertical transverse central section.

The truck is provided with the usual wheels 1, axles 2, journal boxes 3, equalizers 4, and wheel pieces or side frames 5. A driving motor 6 is mounted on one of the axles 2 and a bolster 7 is positioned centrally of the truck, extends between wheel pieces 5, and is carried by springs 8. Transoms 9 and 10 extend from wheel pieces 5 at each side of bolster 7 and preferably integrally connect the opposite wheel pieces to each other.

If transom 10 extended directly from the wheel piece on one side of the truck to the wheel piece on the other side of the truck, as is the usual practice, the axle 2 which mounts motor 6 would have to be spaced far enough away from the transom to avoid interference of the motor therewith.

To enable the motor to be located closer to the center of the truck than is possible under present practice, I form transom 10 so that it extends from each wheel piece 5 downwardly and toward bolster 7, the middle portion of the transom passing under the middle portion of the bolster. This enables the motor to be mounted practically as close to bolster 7 as would be the case if there were no transom present.

While this advantage may be obtained by constructing transom 10 only as described, I prefer to construct the transom 9 similarly and to unite the middle portions of these transoms beneath the bolster. This enables me to cast the transoms integrally with each other whether integral with the side frames or not, thereby producing a more rigid truck frame and also enables me to distribute the torque from motor 6, the nose of which is supported upon the middle portion of transom 10, equally to both transoms and from the latter to the wheel pieces on opposite sides of bolster 7.

I am aware that the particular arrangement of parts may be varied, without departing from the spirit of my invention, and I contemplate those modifications, in adapting my invention to various types of cars, which fall within the scope of the following claims.

I claim:

1. In a car truck, spaced transoms, and a bolster, the ends of which are located between said transoms and at the level of the latter, and the intermediate portion of which overlies said transoms.

2. In a car truck, spaced transoms, and a bolster, the ends of which are located between the ends of said transoms and at the level of the latter, and the intermediate portion of which overlies the intermediate portions of said transoms.

3. In a car truck, a transom, and a bolster, the end of which is in substantial horizontal alignment with the end of said transom, and the intermediate portion of which is substantially in vertical alignment with the intermediate portion of said transom.

4. In a car truck, a wheel piece, a bolster, and a transom extending downwardly and inwardly from the top of said wheel piece and longitudinally of the truck under said bolster.

5. In a car truck, a wheel piece, a bolster, and transoms extending downwardly and inwardly from said wheel piece on each side of said bolster and toward the longitudinal center of said truck.

6. In a car truck, a bolster, and transoms located on opposite sides of said bolster, the middle portions of said transoms being offset vertically and longitudinally of the truck and extending toward each other and being secured together.

7. In a car truck, a bolster, and transoms the ends of which are located on opposite sides of said bolster and at substantially the same vertical height as the latter, the middle portions of said transoms being secured to each other below said bolster.

8. In a car truck, an axle, a bolster, and transoms located on opposite sides of said bolster with their ends at the level of the latter, the middle portions of said transoms extending toward each other below said bolster and being adapted to support the nose of a motor mounted on said axle, which nose is below the level of said bolster.

9. In a car truck, an axle, a side frame member, a bolster and a transom connected to the upper portion of said member, the middle portion of said transom being offset vertically and longitudinally of the truck to permit a motor to be mounted on said axle without lengthening the truck to avoid interference between the motor and transom.

10. In a car truck, a bolster, an axle mounted on one side of said bolster, and a transom located on the opposite side of said bolster and adapted to support the nose of a motor mounted on said axle.

11. In a car truck, wheel pieces, an axle, a bolster located substantially in the horizontal plane of said wheel pieces, and transoms located on opposite sides of said bolster, secured to said wheel pieces and adapted to cooperate to resist the torque of a motor mounted on said axle.

12. In a car truck, wheel pieces forming elevated side frame members, a bolster extending between said wheel pieces, an axle, a motor mounted thereon, a transom located between said bolster and axle, a transom located on the opposite side of said bolster, said transoms being secured to said wheel pieces and cooperating in supporting the nose of said motor.

13. In a car truck, a bolster, and transoms formed integrally with each other and supported on wheel pieces at opposite sides of said bolster and united intermediate their ends and below said bolster.

14. In a car truck, wheel pieces, a bolster, and a transom integral with and extending from one of said wheel pieces and at one side and end of said bolster to the other of said wheel pieces and at the other side and end of said bolster.

15. In a car truck, wheel pieces, a bolster, and a transom integral with and extending diagonally between said wheel pieces and connected thereto on opposite sides of said bolster.

16. In a car truck, wheel pieces, a bolster, and a transom integral with and extending diagonally from one of said wheel pieces under said bolster to the other of said wheel pieces.

17. In a car truck, wheel pieces, a bolster, and transoms integral with said wheel pieces and respectively extending diagonally between said wheel pieces from both sides of said bolster to the opposite sides thereof.

18. In a car truck, wheel pieces, a bolster, and transoms integral with said wheel pieces and respectively extending diagonally between said wheel pieces from both sides of said bolster under the latter to the opposite sides thereof.

19. In a car truck, wheel pieces forming the upper portion of the truck side, a bolster, and transoms respectively extending diagonally between said wheel pieces from both sides of said bolster under the latter to the opposite sides thereof, and interconnected intermediate their ends.

20. In a car truck, an axle, a motor mounted thereon, and a single casting which forms side frame members and spaced transoms which unite to support the nose of said motor.

21. A one piece casting for motor trucks comprising side frame members and transoms spaced apart at their ends to receive a bolster between them and united intermediate their ends.

22. A one piece casting for motor trucks comprising side frame members and transoms spaced apart at their ends to receive a bolster between them and united intermediate their ends and below the plane of the bolster receiving space and provided with a motor supporting face on their united portions.

In testimony whereof I hereunto affix my signature this 23rd day of June, 1921.

H. M. PFLAGER.